(12) United States Patent
Nishiyama

(10) Patent No.: US 8,717,612 B2
(45) Date of Patent: May 6, 2014

(54) CONTROL FOR USER MANAGEMENT INFORMATION IN IMAGE FORMING APPARATUS

(75) Inventor: Kaori Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 13/439,831

(22) Filed: Apr. 4, 2012

(65) Prior Publication Data

US 2012/0268788 A1 Oct. 25, 2012

(30) Foreign Application Priority Data

Apr. 22, 2011 (JP) ................................ 2011-096302

(51) Int. Cl.
*G06K 15/02* (2006.01)
(52) U.S. Cl.
USPC ............................ 358/1.16; 358/1.1; 358/1.13
(58) Field of Classification Search
USPC ............... 358/1.1, 1.13, 1.15, 1.16, 400, 401, 358/408, 444
See application file for complete search history.

(56) References Cited

U.S. PATENT DOCUMENTS

| 7,050,725 | B2 * | 5/2006 | Jingu | 399/2 |
| 7,602,516 | B2 * | 10/2009 | Ito | 358/1.15 |
| 8,531,690 | B2 * | 9/2013 | Takahashi | 358/1.13 |
| 2008/0092144 | A1 * | 4/2008 | Nakazawa | 718/105 |
| 2012/0242846 | A1 * | 9/2012 | Iwase | 348/207.2 |

FOREIGN PATENT DOCUMENTS

JP 2008145595 A 6/2008

* cited by examiner

*Primary Examiner* — Thomas D Lee
(74) *Attorney, Agent, or Firm* — Fitzpatrick, Cella, Harper & Scinto

(57) ABSTRACT

An image forming apparatus includes a determining unit configured to determine whether or not the image forming apparatus is in a system operating state of being constructed in such a manner as to supply the paper, on which the first image data is printed, via the output unit to the other image forming apparatus, a unit configured to, in a case where it is determined that the image forming apparatus is in the system operating state by the determining unit, obtain user management information of the other image forming apparatus from the apparatus, a unit configured to combine the obtained user management information of the other image forming apparatus with the user management information stored in the storage unit to generate combination user management information used at the system operating state, and a unit configured to store the generated combination user management information in the storage unit.

9 Claims, 7 Drawing Sheets

|   | APPARATUS ID | USER ID | PASS WORD | COMBINATION SETTING INFORMATION | UPDATE DATE AND TIME |
|---|---|---|---|---|---|
| 1 | FC-01 | t_yamada | **** | COMBINE | 2010/12/15 13:56 |
| 2 | | a_sato | **** | NOT COMBINE | |
| 3 | | m_tanaka | **** | COMBINE | |
| 4 | | k_saito | **** | NOT COMBINE | |
| 5 | | y_yamamoto | **** | COMBINE | |
| 6 | | k_suzuki | **** | COMBINE | |
| 7 | | h_ito | **** | NOT COMBINE | |

FIG.2A

|   | APPARATUS ID | USER ID | PASS WORD | COMBINATION SETTING INFORMATION | UPDATE DATE AND TIME |
|---|---|---|---|---|---|
| 1 | CL-01 | t_yamada | **** | COMBINE | 2010/11/30 10:45 |
| 2 | | m_tanaka | **** | NOT COMBINE | |
| 3 | | k_saito | **** | COMBINE | |

FIG.2B

| | APPARATUS ID | USER ID | PASS WORD | COMBINATION SETTING INFORMATION | | UPDATE DATE AND TIME |
|---|---|---|---|---|---|---|
| | | | | HOST APPARATUS | OTHER APPARATUS | |
| 1 | FC-01 | t_yamada | **** | COMBINE | COMBINE | 2011/2/28 16:11 |
| 2 | | y_yamamoto | **** | COMBINE | - | |
| 3 | | k_suzuki | **** | COMBINE | - | |

FIG.4

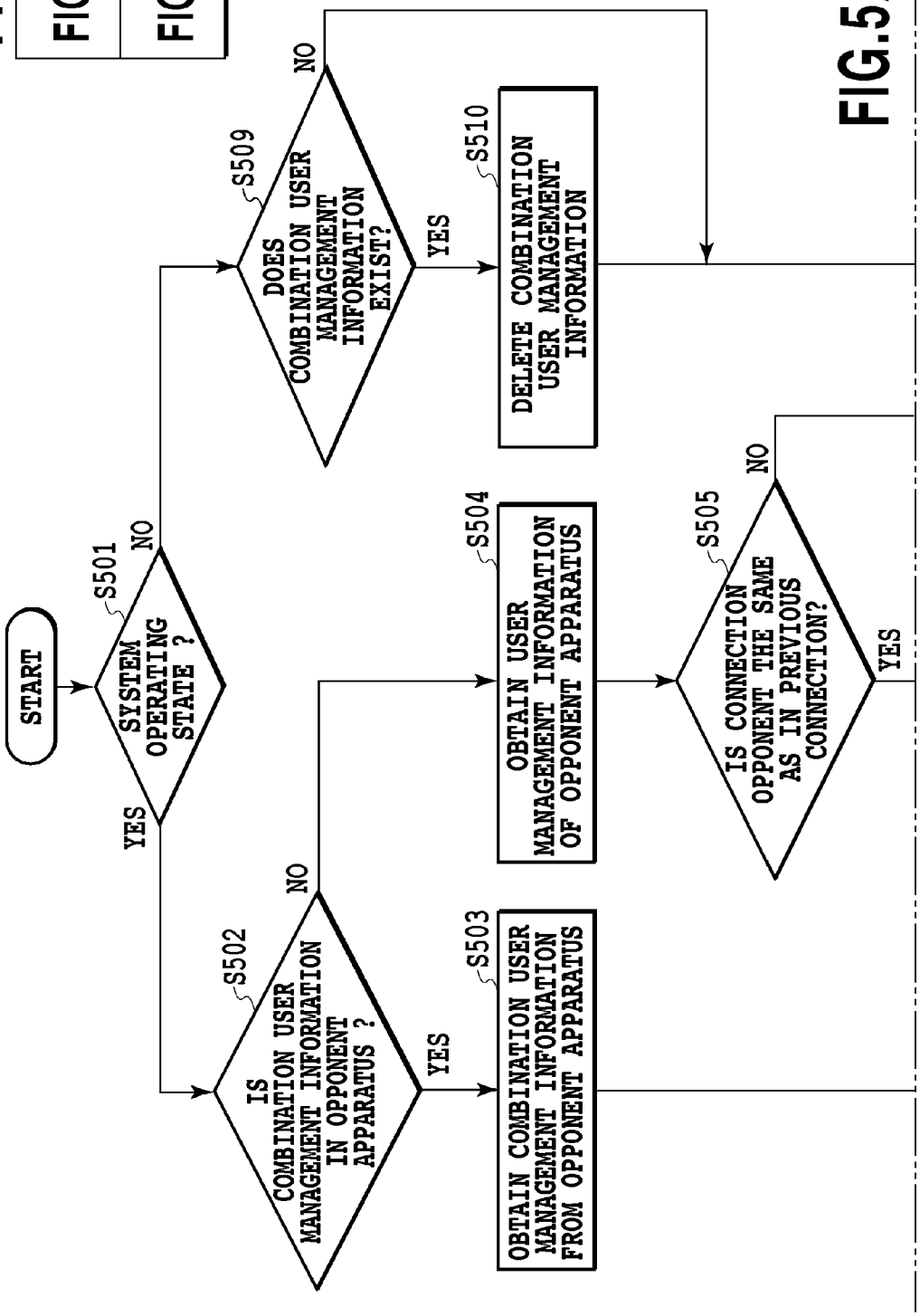

CONTROL FOR USER MANAGEMENT INFORMATION IN IMAGE FORMING APPARATUS

BACKGROUND OF THE INVENTION

1. Field of the Invention

The present invention relates to control for user management information in an image forming apparatus which can be used independently, as well as in cooperation with another image forming apparatus.

2. Description of the Related Art

In recent years there has been widely spread an image forming apparatus which performs printing using transparent toner (clear toner) which is one kind of specific printing agents. For example, in a case of entire surface coating in which the clear toner is printed on an entire surface of a printing medium (paper or the like), the clear toner is used on an entire printing-possible region of the paper for printing after the printing is performed by colored toner (for example, CMYK toner), thereby making it possible to provide a glossy feeling like a photography on the entire surface of the paper. In addition, in a case of partial coating in which the clear toner is printed only on a partial region of the paper, the clear toner is used only on an indicated region of the paper for printing after the printing is performed by the colored toner, thereby making it possible to bring in a decoration effect by a partial glossy feeling. Since various expressions which are impossible in the colored toner can be made in the printing using the clear toner in this manner, an additional value of a printout matter can be improved.

There is also a method of performing the printing using the cleat toner with a single image forming apparatus, that is, a method in which, after colored toner and clear toner are transferred on a paper, a colored toner image and a clear toner image are fixed on the paper by one time of fixation for printing.

In this method, however, there occurs a problem that the clear toner can not be sufficiently used due to an adhesion amount limit of toner. That is, an upper limit of a toner amount per unit area of a paper for printing, which is fixable by one time of fixation, is defined, and the toner amount is restricted within the toner adhesion amount limit in a region where the colored toner is used in a great deal amount. As a result, there occurs the problem that the clear toner can not be sufficiently used.

Therefore, there is proposed the buildup of an image processing system in which an image processing apparatus for performing printing using colored toner and an image processing apparatus for performing printing using clear toner are physically connected for producing an output matter using the clear toner (Japanese Patent Laid-Open No. 2008-145595). For example, for a user using the clear toner, there is proposed an image processing system in which an image processing apparatus (former apparatus) for performing printing by implementing transfer and fixation using colored toner is connected to an image processing apparatus (latter apparatus) for performing printing by implementing transfer and fixation using clear toner. With this construction, both of the CMYK toner and the clear toner can be sufficiently used to a printing object.

As describe above, in a case where the image forming system is built by connecting a plurality of image forming apparatuses with each other, there occurs a problem on how to deal with "user management information" registered in each of the image forming apparatuses.

Here, "user management information" indicates various kinds of information which relate to the image forming apparatus and are managed for each user. For example, the user management information includes a user account composed of user ID, a pass word and the like for identifying a user to confirm use authority of the image forming apparatus, image data registered in the image forming apparatus, sending address information at the time of sending the image data and the like via a network, and the like.

Since such user management information exists for each of the image forming apparatuses, for connecting a plurality of image forming apparatuses to be used as a single image forming system, it is necessary to additionally register the user management information relating to one of image forming apparatuses constituting the system to the other of the image forming apparatuses. FIG. 6 is a diagram showing a state of the additional registration of the user management information. For example, in a first image forming apparatus, it is understood that user management information B in a second image forming apparatus is additionally registered to the existing user management information A. In addition, a service man or an administrator manually performs this additional registration conventionally. Therefore, there is concern that there occurs a problem due to a human induced error that, for example, in a case where a registration of some user is leaked at an additional registration of a user account, even if the user has an attempt of inputting a login, an identification error occurs, making it impossible to use the image forming apparatus.

Further, there is a demand for releasing the connection of the apparatuses constituting the system as needed and using the respective image forming apparatuses independently, and in such a use form, it is necessary to return the user management information additionally registered, back to an original state. Since the returning operation is also manually performed in the same way as the above operation, it requires troublesome tasks and also there is a possibility that there occurs a risk of mixing of a human induced error as described above.

SUMMARY OF THE INVENTION

The present invention is provided with an image forming apparatus comprising, a storage unit configured to store user management information, a printing unit configured to, in a case where a printing job includes first image data and second image data, print the first image data in the printing job, an output unit which outputs a paper on which the first image data is printed and is connected to a feeding unit in another image forming apparatus equipped with a printing unit configured to print the second image data, a determining unit configured to determine whether or not the image forming apparatus is in a system operating state of being constructed in such a manner as to supply the paper, on which the first image data is printed, via the output unit to the other image forming apparatus, a unit configured to, in a case where it is determined that the image forming apparatus is in the system operating state by the determining unit, obtain user management information of the other image forming apparatus from the apparatus, a unit configured to combine the obtained user management information of the other image forming apparatus with the user management information stored in the storage unit to generate combination user management information used at the system operating state, and a unit configured to store the generated combination user management information in the storage unit.

According to the present invention, a service man or an administrator is released from the aforementioned troublesome operation at the time of connecting the plurality of the image forming apparatuses or at the time of releasing the connection thereof, and more secure registration management of the user management information can be realized in the image forming system or independent image forming apparatus.

Further features of the present invention will become apparent from the following description of exemplary embodiments (with reference to the attached drawings).

BRIEF DESCRIPTION OF THE DRAWINGS

FIGS. 2A and 2B are diagrams each showing an example of user management information;

FIG. 4 is a diagram showing an example of combination user management information;

FIG. 5 is a diagram showing the relationship of FIGS. 5A and 5B;

FIG. 5A is a flowchart showing a flow of a user management information controlling process according to a third embodiment;

DESCRIPTION OF THE EMBODIMENTS

Hereinafter, embodiments for carrying out the present invention will be explained with the accompanying drawings.

First Embodiment

Figure 1:
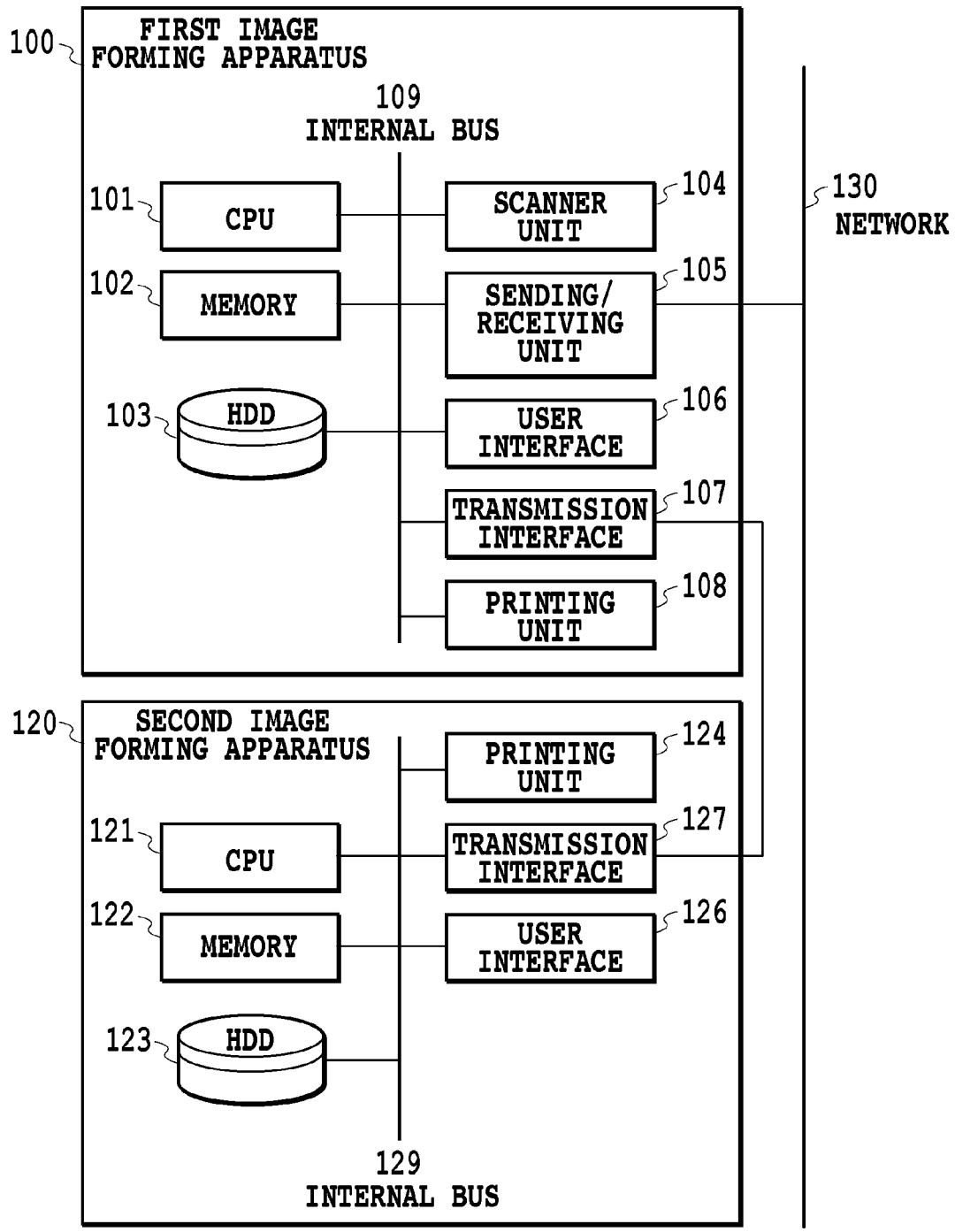
FIG. 1 is a diagram showing an example of the construction of an image forming system.

FIG. 1 is a diagram showing an example of the construction in an image forming system constructed of a plurality of image forming apparatuses. The image forming system is in a state (hereinafter, called "a system operating state") where two image forming apparatuses, each of which can function as an independent image forming apparatus, are physically connected and function as one system in cooperation with each other.

In this system, a printing job is first inputted via a network to a first image forming apparatus 100. The printing job is constructed of first image data and second image data corresponding to the first image data. In addition, the first image data is processed to be printed in the first image forming apparatus 100, and the second image data is processed to be printed in a second image forming apparatus 120.

A paper on which the first image data is printed in the first image forming apparatus 100 is outputted from an output unit in the first image forming apparatus 100, and is fed to a feeding unit in the second image forming apparatus 120.

The image forming apparatus 120 prints the second image data on the fed paper. As described above, the printing job inputted to the system is processed to be printed using the two image forming apparatuses.

Number 100 indicates the first image forming apparatus for performing a print by colored toner having one or more colors, such as CMYK toner. The first image forming apparatus 100 is constructed of a CPU 101, a memory 102, an HDD 103, a scanner unit 104, a sending/receiving unit 105, a user interface 106, a transmission interface 107, and a printing unit 108, which are connected by an internal bus 109. Hereinafter, each unit will be explained.

The CPU 101 is a processor for integrally controlling the respective units to be further described later, and executes an OS or programs such as applications stored in the memory 204. The memory 102 is constructed of a RAM and a ROM and stores various commands (OS and application programs) to be executed by the CPU 101 for controlling the first image forming apparatus 100, the execution results and the like.

The HDD 103 is the storage unit used for preservation of a large capacity of data such as image data scanned in the scanner unit 104, storage of execution codes of programs and the like, and stores data required to be stored for a longer time as compared to the memory 102. The aforementioned user management information is stored in the HDD 103. Here, a region, where the user management information is stored, among a data storage region, is divided into a user management information storage region at a single unit operation referred to as at the time the image forming apparatus 100 is independently used and a user management information storage region at a system operation referred to as at a system operating state. It should be noted that the user management information may be stored in the RAM of the memory 102. Further, information of a use log at the time of being used in a system operating state is also stored in the HDD 103.

The scanner unit 104 is a document readout apparatus for scanning a document set on a document table (not shown) to obtain image data.

The sending/receiving unit 105 sends/receives digital data. For example, the sending/receiving unit 105 receives a printing job (PDL data) from an external PC or the like, and along with it, performs FAX sending/receiving, E-mail sending, SMB sending and the like.

The user interface 106 provides information to a user or receives instructions from the user. For example, the user interface 106 is constructed of a touch panel display and a user can execute desired processes via an operating display screen (not shown) thereof, such as an input operation at a login, facsimile sending or printing.

The transmission interface 107 is an interface for transmission with the second image forming apparatus 120, for example, a USB (Universal Serial Bus) interface. The transmission process for checking whether or not the image forming apparatus is in a system operating state via the transmission interface 107, sending of a printing job to the second image forming apparatus 120 in the system operating state, and the like are executed.

The printing unit 108 executes a printing process to a printing paper medium such as a sheet paper using print data subjected to an image process for printing.

Number 120 indicates the second image forming apparatus and is the same as the first image forming apparatus except a point where the internal construction is not provided with a construction corresponding to the scanner unit 104 and the sending/receiving unit 105. That is, number 121 corresponds to the CPU 101, number 122 corresponds to the memory 102, number 123 corresponds to the HDD 103, number 124 corresponds to the printing unit 108, number 126 corresponds to the user interface 106, and number 127 corresponds to the transmission interface 107, which are respectively connected via an internal bus 129.

Number 130 is a network such as LAN and is connected to the sending/receiving unit 105 in the image forming apparatus 100. In addition, the network 130 is also connected to an external device such as PC (not shown). For example, when a user instructs a print from PC, the print data is sent via the network 130 to the sending/receiving unit 105 in the image forming apparatus 100.

It should be noted that in FIG. 1, a case where the image forming system is constructed of the two image forming apparatuses is explained as an example. However, the image forming system may be constructed of three or more image forming apparatuses.

(User Management Information)

Next, the user management information in the present invention will be explained.

FIGS. 2A and 2B show examples of the user management information according to the present invention, which is composed of columns of Apparatus ID, User ID, Pass word, Combination setting information, and Update date and time respectively. Here, "combination setting information" is information for indicating whether or not the user management information in the image forming apparatus is combined with user management information in the other image forming apparatus in a case of a system operating state. In a case where the setting content is "combine", use of the user management information in the system operating state with the other image forming apparatus is permitted to the user. On the other hand, in a case where the setting content is "not combine", use of the user management information in the system operating state with the other image forming apparatus is not permitted to the user, and only use of the user management information in the image forming apparatus as a single unit in the user registration is permitted. By performing the combination setting for each user, it is possible to execute the management that only use of the user management information in the image forming apparatus as a single unit is permitted and use thereof in the system operating state is not permitted, for each user. It should be noted that in a case where the setting contents of the combination setting information are contradictory with each other, that is, due to a difference in setting timing or the like, there possibly occurs the event that in the image forming apparatus, the setting information is "combine", but in the other image forming apparatus, the setting information is "not combine". In such a case, in the present embodiment, as described later, only in a case where the setting contents of both the apparatuses are "combine", the combination is made. However, if the setting content in either one of the setting contents is "combine", the combination may be made. In addition, the update date and time shows the latest date and time in a case where any change in the user management information, such as addition of the user ID, change of the pass word or change of the combination setting information, is made.

In addition, the user management information is retained in each of the image forming apparatuses, and is used as it is in a case where the image forming apparatus is operated as a single unit. On the other hand, when the image forming apparatus is in a system operating state, the user management information is combined with the user management information having a combination setting according to the other image forming apparatus corresponding to the setting content of the combination setting, thus producing new user management information (hereinafter, called "combination user management information") used at a system operating state.

FIG. 2A shows user management information with a combination setting in the image forming apparatus 100. First, user ID corresponding to each of users of "t_yamada", "a_sato", "m_tanaka", "k_saito", "y_yamamoto", "k_suzuki", and "h_ito" is registered in each column of User ID. A pass word used at a login is registered in each column of Pass word for each user ID. Information showing any of "combine" and "not combine" is put in each column of Combination setting information, which is mutually associated with each user ID by one to one. FIG. 2B shows user management information with a combination setting in the image forming apparatus 120, wherein "t_yamada", "m_tanaka", and "k_saito" are respectively registered in the columns of User ID.

(Control of User Management Information)

Next, control of the user management information executed at activation of each image forming apparatus constituting the image forming system will be explained. Here, an explanation will be made of a case of activating the first image forming apparatus 100 shown in FIG. 1 as an example.

Figure 3:
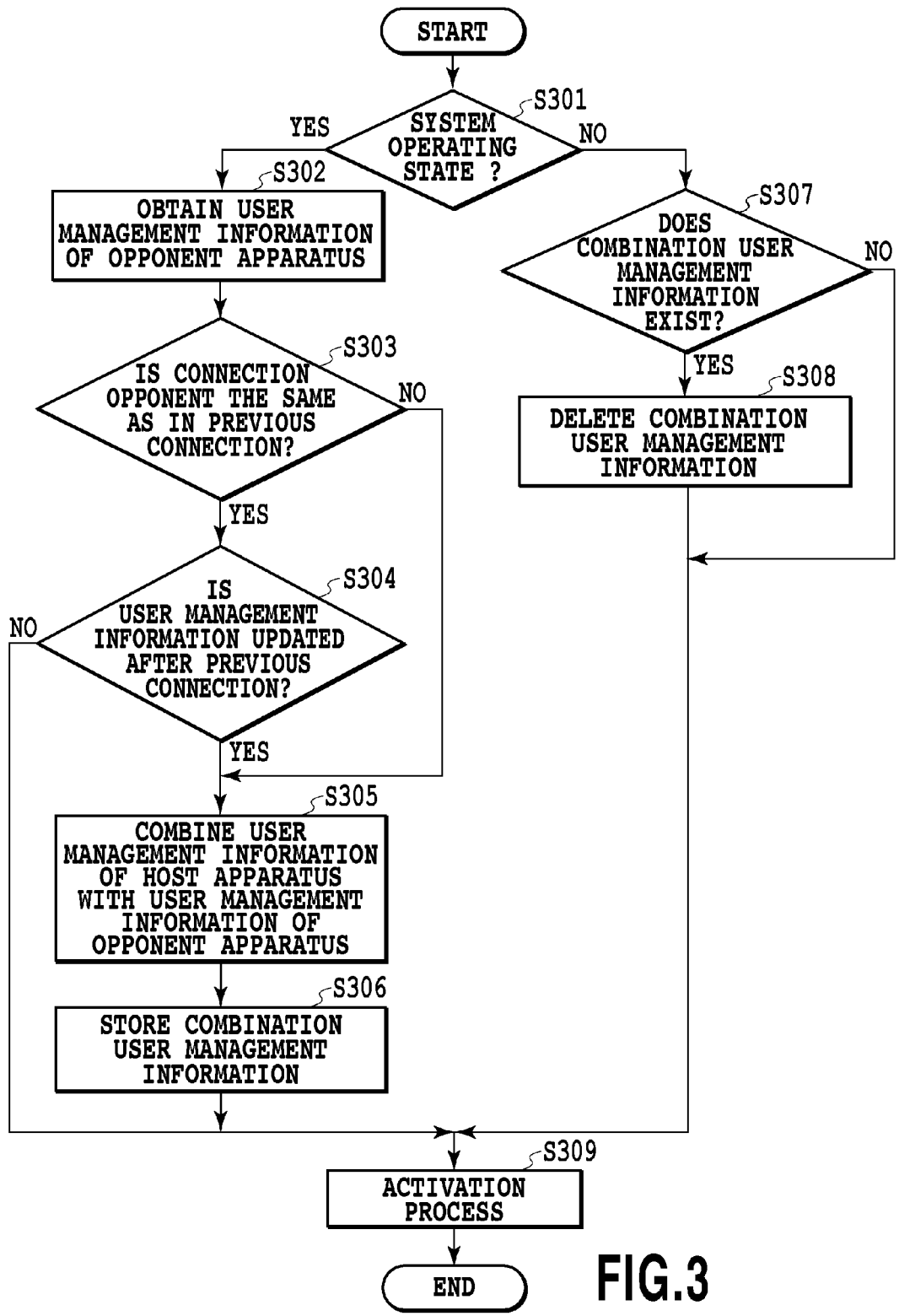
FIG. 3 is a flowchart showing a flow of a user management information controlling process according to a first embodiment.

FIG. 3 is a flowchart showing a flow of a user management information controlling process.

Upon receiving an activation instruction from a user, at step 301 the CPU 101 determines whether or not the image forming apparatus is in a system operating state, that is, determines whether or not the image forming apparatus 100 cooperates with the other image forming apparatus 120, which functions as a single system. The determination on whether or not the image forming apparatus is in the system operating state is made based upon whether or not the connection with the other image forming apparatus can be confirmed, for example, whether or not an appropriate response is made as a result of performing transmission between the transmission interface 107 and the transmission interface 127. For example, in a case where each of the transmission interface 107 and the transmission interface 127 is a USB interface, the image forming apparatus 100 and the image forming apparatus 120 are mutually connected via a USB cable. In this state, in a case where the image forming apparatus 100 recognizes the connection with the image forming apparatus 120, it is determined that the image forming apparatus is in the system operating state. It should be noted that, since the details of the apparatus recognition by the USB connection are not an essential part in the present invention, the explanation is omitted. When the image forming apparatus is in the system operating state, the process goes to step 302. On the other hand, when the image forming apparatus is not in the system operating state, the process goes to step 307.

At step 302, the CPU 101 obtains user management information from the image forming apparatus 120 as an opponent of the connection via the transmission interface 107. More specially the CPU 101 in the image forming apparatus 100 makes a sending request of the user management information with the combination setting registered in the image forming apparatus 120 to the apparatus 120. Upon receiving this request, the CPU 121 in the image forming apparatus 120 reads out the user management information with the combination setting from the user management information storage region at a single unit operation in the HDD 123 and sends the user management information to the image forming apparatus 100. The CPU 101 in the image forming apparatus 100 receives the sent user management information with combination setting via the transmission interface 107.

At step 303, the CPU 101 determines whether or not the opponent of the connection is the same as the image forming apparatus at the previous connection. In a case where the opponent of the connection is the same as at the previous connection, the process goes to step 304. On the other hand, in a case where the opponent of the connection is not the same as at the previous connection, the process goes to step 305.

At step 304, the CPU 101 reads out the user management information of the host apparatus from the user management information storage region at the single unit operation in the HDD 103. Then the CPU 101 checks whether or not either one or both of the read user management information in the host apparatus and the user management information in the opponent apparatus obtained at step 302 are different from those at the previous system operation (whether or not the content is updated). Presence/absence of the update is determined based upon information of the update date and time included in the user management information and history information of the system operation stored in the HDD 103. In a case where the content is updated, the process goes to step 305. On the other hand, in a case where the content is not updated and has no change, the process goes to step 309. That is, in a case where the host apparatus and the opponent apparatus both have no change in the user management information and have the same content as at the previous connection, since it is not necessary to newly execute the combination process, the process jumps to step 309 without going to step 305.

At step 305, the CPU 101 combines the user management information in the host apparatus read out at step 304 with the user management information of the opponent apparatus obtained at step 302 to generate combination user management information. For example, in a case of the user management information with the combination setting in FIG. 2A, the above combination is made as follows, forming the combination user management information.

First, the registered user "t_yamada" is registered in both of the image forming apparatus 100 and the image forming apparatus 120, and any content of Combination setting information is "combine" in both the apparatuses. Therefore, the registered user "t_yamada" is registered in the combination user management information. The registered user "m_tanaka" is registered in both of the image forming apparatus 100 and the image forming apparatus 120, and the content of the combination setting information is "combine" in the image forming apparatus 100, but "not combine" in the image forming apparatus 120. Therefore, the registered user "m_tanaka" is not registered in the combination user management information. The registered user "k_saito" is registered in both of the image forming apparatus 100 and the image forming apparatus 120, and the content of the combination setting information is "combine" in the image forming apparatus 120, but "not combine" in the image forming apparatus 100. Therefore, the registered user "k_saito" is not registered in the combination user management information. The registered users "y_yamamoto" and "k_suzuki" both are registered only in the image forming apparatus 100, and the contents of the combination setting information both are "combine". Therefore, the both are registered in the combination user management information. The registered user "h_ito" is registered only in the image forming apparatus 100, and the content of the combination setting information is "not combine". Therefore, the registered user "h_ito" is not registered in the combination user management information.

FIG. 4 shows the combination user management information generated based upon the combination setting information in this manner. In this case, "t_yamada", y_yamamoto" and "k_suzuki" can use the image forming apparatus 100 in the system operating state with the image forming apparatus 120 as a single printing system.

At step 306, the CPU 101 stores the generated combination user management information in the user management information storage region at the system operation in the HDD 103.

On the other hand, at step 307 in a case where it is determined at step 301 that the image forming apparatus is not in the system operating state, the CPU 101 determines whether or not the combination user management information is stored in the user management information storage region at the system operation in the HDD 103. When it is determined that the combination user management information is stored therein, the process goes to step 308. On the other hand, when it is determined that the combination user management information is not stored therein, the process goes to 309.

At step 308, the CPU 101 clears the user management information storage region at the system operation in the HDD 103 to delete the combination user management information.

At step 309, the CPU 101 executes an activation process corresponding to a state of the host apparatus. Specially in a case of the system operating state, the CPU 101 reads out the combination user management information from the user management information storage region at the system operation in the HDD 103 and executes a necessary user identification process and the like using the combination user management information. In addition, in a case where the image forming apparatus is not in the system operating state, but in the operation as a single unit, the CPU 101 reads out usual user management information from the user management information storage region at the single unit operation in the HDD 103 and executes a necessary user identification process and the like using the user management information.

It should be noted that the present flow is explained as the process in the first image forming apparatus 100, but the similar process is executed also in the second image forming apparatus 120.

In the flowchart shown in FIG. 3, in a case where it is found that the image forming apparatus is in the operation as the single unit at a point where the activation process is executed based upon reception of the activation instruction from a user, the combination user management information is deleted, but it may be deleted as one element of a shutdown process upon receiving a shutdown instruction from the user.

As described above, in the image forming apparatus according to the present embodiment, when it is found that the image forming apparatus is in the system operating state, the user management information of the host apparatus and the user management information of the opponent apparatus are combined to generate the single user management information. Therefore troublesome tasks and human induced errors due to the manual operations conventionally performed by the serviceman or the administrator can be eliminated.

In addition, in a case where the connection is released and the image forming apparatus is used as a single unit, since the image forming apparatus is activated after the user management information is returned to an original state, the security protection is also achieved.

Second Embodiment

In the first embodiment, when it is confirmed that the image forming apparatus is connected to the other image forming apparatus, considering that the image forming apparatus is in the system operating state of functioning as a single system, the user management information of the host apparatus and the user management information of the opponent apparatus are combined to generate the single user management information.

In a state of being connected to the other image forming apparatus, however, there is possibly a case where the image forming apparatus is desired to be used as a single unit. For example, it is a case where there occurs the event that the image forming apparatus is temporarily required to be used as a single unit, but is returned back to a system operating state Therefore, there will be explained the event that in a case where the image forming apparatus is in a particular situation, even if it is confirmed that the image forming apparatus is connected to the other image forming apparatus, the image forming apparatus is not treated as being in a system operating state, as a second embodiment.

It should be noted that a difference of the second embodiment from the first embodiment is a determination reference at step 301 in the aforementioned flowchart of FIG. 3. Accordingly an explanation will be herein made of how the determination reference is modified and the remaining part is omitted.

Modification 1

In a case where a sending/receiving unit exists as a construction element in the image forming apparatus, which is transmittable with external devices as a single unit, even if it is confirmed that the image forming apparatus is connected to the other image forming apparatus, it is possibly determined that the image forming apparatus is not in a system operating state. For such a determination, for example, it may be determined that the image forming apparatus is not in the system operating state in a case where in the determination process at step 301 in FIG. 3 (or prior to it), the information relating to the apparatus construction in the host apparatus is read out from the HDD or the like, which has an external transmission function and is transmittable.

Modification 2

In a case where in the user interface of the image forming apparatus, an input operation is possible and a printing job can be inputted to the image forming apparatus, even if it is confirmed that the image forming apparatus is connected to the other image forming apparatus, it is possibly determined that the image forming apparatus is not in a system operating state. For such a determination, for example, it may be determined that the image forming apparatus is not in the system operating state in a case where in the determination process at step 301 in FIG. 3 (or prior to it), the information relating to the apparatus construction in the host apparatus is read out from the HDD or the like, wherein the user interface function is possible.

Modification 3

An item is provided in a user setting of the image forming apparatus for setting whether the image forming apparatus is operated in a system operating state or as a single unit. It may be determined whether or not the image forming apparatus is in a system operating state by confirming a setting content of the item.

As described above, since the determination on whether or not the image forming apparatus is in the system operating state is made based upon the more precise condition in the image forming apparatus according to the present embodiment, a request from a user can be flexibly responded to.

Third Embodiment

In each of the first and second image forming apparatuses, the image forming apparatuses are mutually connected, wherein both of the image forming apparatuses in the system operating state exchange the user management information with each other. Each of the image forming apparatuses constituting the system generates the combination user management information used at the system operating state. Here, a case where one of the image forming apparatuses generates the combination user management information and the generated combination user management information is delivered to the other image forming apparatus will be explained as a third embodiment.

Figure 5B:
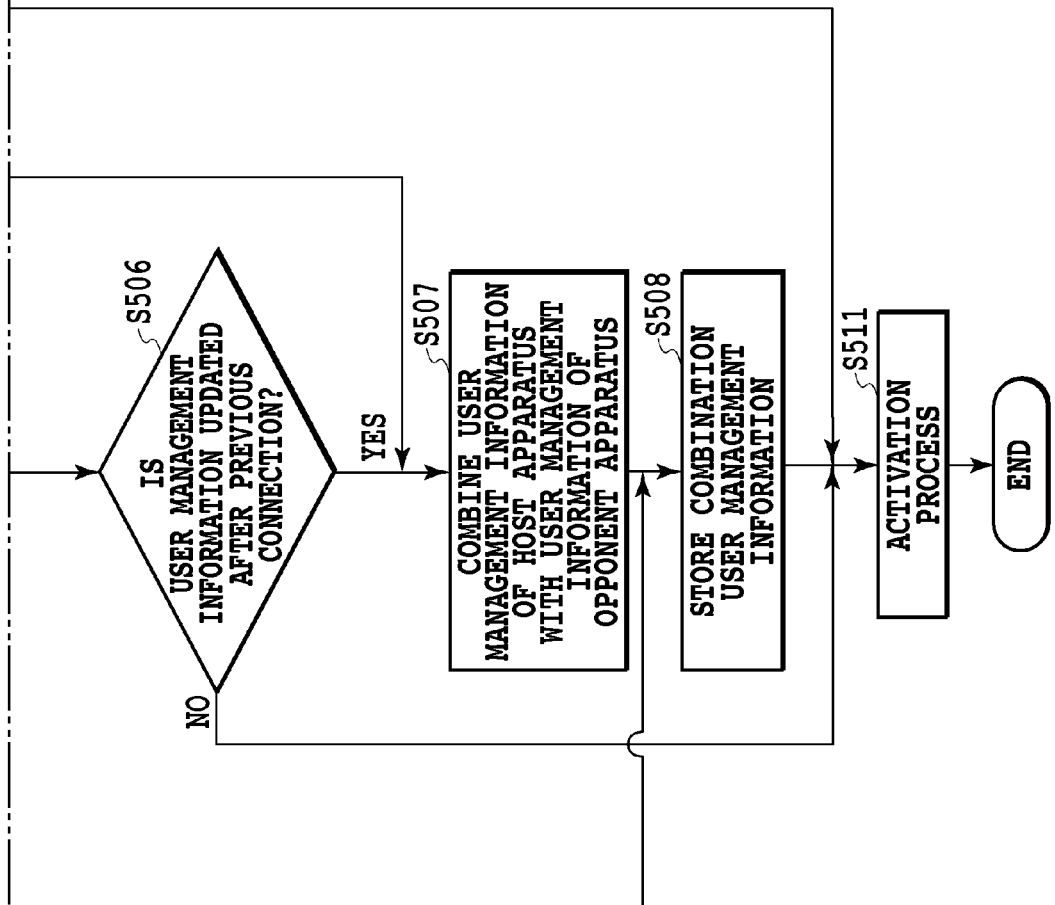
FIG. 5B is a flowchart showing a flow of a user management information controlling process according to a third embodiment.
Figure 6:
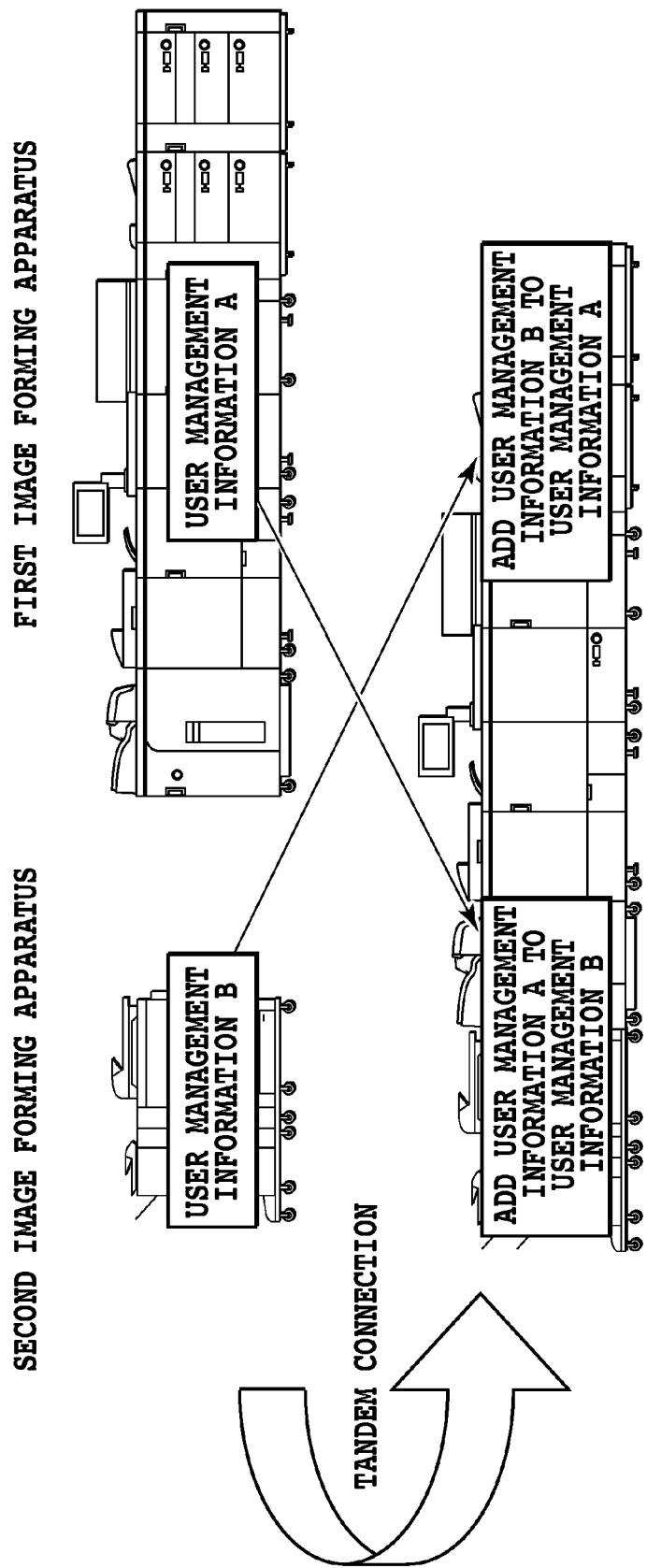
FIG. 6 is a diagram expressing a state of an additional registration of user management information in the conventional technology.

FIGS. 5A and 5B are flowcharts showing a flow of a user management information controlling process executed in an image forming apparatus according to the preset embodiment. It should be noted that an explanation of components common to those in the flowchart in FIG. 3 according to the first embodiment is simplified or omitted, and mainly different points will be explained. In addition, here, as similar to the first embodiment, a case of activating the first image forming apparatus 100 shown in FIG. 1 will be explained as an example.

Upon receiving an activation instruction from a user, at step 301 the CPU 101 determines whether or not the image forming apparatus is in a system operating state. When it is determined that the image forming apparatus is in the system operating state, the process goes to step 502, and when it is determined that the image forming apparatus is not in the system operating state, the process goes to step 509. Steps 509 and 510 correspond to steps 307 and 308 in the flowchart in FIG. 3 and the contents thereof are similar thereto, which therefore are not restated herein.

At step 502, the CPU 101 determines whether or not combination user management information is already generated in an apparatus as a connection opponent (herein, image forming apparatus 120). Specially the CPU 101 makes a confirmation request of presence/absence of the combination user management information via the transmission interface 107 to the image forming apparatus 120 as the connection opponent. In response to this confirmation request, the CPU 121 in the image forming apparatus 120 checks whether or not the combination user management information is stored in a user management storage region at a system operation in an HDD 123 and returns the presence/absence of the storage via the transmission interface 127 to the image forming apparatus 100. In addition, the CPU 101 determines the presence/absence of the combination user management information according to the response received. When it is determined that the combination user management information is in the opponent apparatus, the process goes to step 503, and when it is determined that the combination user management information is not in the opponent apparatus, the process goes to step 504. Steps 504 to 508 correspond to steps 302 to 306 in the flowchart of FIG. 3 and the contents thereof are similar thereto, which therefore are not restated herein.

At step 503, the CPU 101 obtains the generated combination user management information via the transmission interface 107 from the apparatus as the connection opponent (herein, the image forming apparatus 120). At step 508 the obtained combination user management information is stored in the user management information storage region at a system operation in the HDD 103.

In addition, at step 511 the CPU 101 executes the activation process corresponding to a state of the host apparatus.

As described above, in the image forming apparatus according to the present embodiment, only one of the image forming apparatuses generates the combination user management information and the other image forming apparatus is not required to generate the combination user management information. Therefore the process at activation in the other image forming apparatus can be simplified.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-096302, filed Apr. 22, 2011, which is hereby incorporated by reference herein in its entirety.

What is claimed is:

1. An image forming apparatus comprising:
   a storage unit configured to store user management information;
   a printing unit configured to, in a case where a printing job includes first image data and second image data, print the first image data in the printing job on a paper;
   an output unit which outputs the paper on which the first image data is printed and is connected to a feeding unit in another image forming apparatus equipped with a printing unit configured to print the second image data;
   a determining unit configured to determine whether or not the image forming apparatus is in a system operating state of being constructed in such a manner as to supply the paper via the output unit to the other image forming apparatus;
   an obtaining unit configured to, in a case where it is determined by the determining unit that the image forming apparatus is in the system operating state, obtain user management information of the other image forming apparatus from the other image forming apparatus;
   a generating unit configured to combine the obtained user management information of the other image forming apparatus with the user management information stored in the storage unit to generate combination user management information used at the system operating state; and
   a storing unit configured to store the generated combination user management information in the storage unit.

2. An image forming apparatus according to claim 1, wherein
   the user management information includes combination setting information which indicates whether or not the user management information is combined with user management information in the other image forming apparatus in a case of the system operating state, and
   the generating unit generates the combination user management information using the combination setting information.

3. An image forming apparatus according to claim 1, wherein the determining unit determines that the image forming apparatus is in the system operating state in a case where the connection with the other image forming apparatus is confirmed.

4. An image forming apparatus according to claim 1, wherein the determining unit determines that the image forming apparatus is in the system operating state in a case where the connection with the other image forming apparatus can be confirmed, and at least one of events that
   a sending/receiving unit does not exist as a construction element in the other image forming apparatus,
   in a user interface in the other image forming apparatus, an input operation is possible and a printing job is not in a state of being capable of being inputted to the apparatus, and
   in a user setting in the other image forming apparatus, a setting of operating the apparatus in the system operating state is made,
   can be confirmed.

5. An image forming apparatus according to claim 1, wherein in a case where the determining unit determines that the image forming apparatus is not in the system operating state, when the combination user management information is stored in the storage unit, the combination user management information is deleted from the storage unit.

6. An image forming system constructed by connecting the image forming apparatus according to claim 1, wherein the combination user management information is generated in each of a plurality of image forming apparatuses constituting the image forming system.

7. An image forming system constructed by connecting the image forming apparatus according to claim 1, wherein
   the combination user management information is generated only in one of image forming apparatuses constituting the image forming system, and
   the generated combination user management information is supplied to the remaining image forming apparatuses by the one image forming apparatus.

8. A control method of user management information in an image forming apparatus comprising:
   a storage unit configured to store user management information;
   a printing unit configured to, in a case where a printing job includes first image data and second image data, print the first image data in the printing job on a paper; and
   an output unit which outputs the paper on which the first image data is printed and is connected to a feeding unit in another image forming apparatus equipped with a printing unit configured to print the second image data,
   the control method comprising the steps of:
   determining whether or not the image forming apparatus is in a system operating state for functioning as a single image forming system of being constructed in such a manner as to supply the paper via the output unit to the other image forming apparatus;
   in a case where it is determined by the determining step that the image forming apparatus is in the system operating state, obtaining user management information of the other image forming apparatus from the other image forming apparatus;
   combining the obtained user management information of the other image forming apparatus with the user management information stored in the storage unit to generate combination user management information used at the system operating state; and
   storing the generated combination user management information in the storage unit.

9. A non-transitory computer readable storage medium storing a program for causing a computer to perform the control method according to claim 8.

* * * * *